(12) United States Patent
Konno et al.

(10) Patent No.: US 7,295,399 B2
(45) Date of Patent: Nov. 13, 2007

(54) FLOPPY DISK DRIVE

(75) Inventors: Makoto Konno, Yamagata (JP);
Hisateru Komatsu, Yamagata (JP);
Noriyuki Kobayashi, Yamagata (JP);
Shinji Endo, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 384 days.

(21) Appl. No.: 11/066,089

(22) Filed: Feb. 25, 2005

(65) Prior Publication Data

US 2006/0002010 A1   Jan. 5, 2006

(30) Foreign Application Priority Data

Jun. 30, 2004   (JP) .............................. 2004-194838

(51) Int. Cl.
*G11B 5/016* (2006.01)
(52) U.S. Cl. .................................................. 360/99.02
(58) Field of Classification Search ............. 360/99.02, 360/133, 99.04, 99.06, 99.08, 99.01
See application file for complete search history.

(56) References Cited

U.S. PATENT DOCUMENTS

| 5,898,539 | A   | * | 4/1999 | Yokota et al. ........... 360/99.06 |
| 2001/0006442 | A1 | * | 7/2001 | Komatsu et al. ......... 360/99.04 |
| 2003/0039058 | A1 | * | 2/2003 | Komatsu et al. ......... 360/99.02 |
| 2003/0043501 | A1 | * | 3/2003 | Komatsu et al. ......... 360/99.02 |

* cited by examiner

*Primary Examiner*—Allen Cao
(74) *Attorney, Agent, or Firm*—Patents+TMS, P.C.

(57) ABSTRACT

A floppy disk drive includes a frame having a bottom portion and left and right walls and a casing for covering the frame. The casing includes an upper cover for covering an upper side of the frame and a lower cover for covering a lower side of the frame, in which the upper cover has a top plate and left and right side plates, and the lower cover has a bottom plate and left and right plates. Each of the side walls of the frame is designed so as to have size and height that are partially overlapped with the side plate of the upper cover and the side plate of the lower cover, respectively, at each side of the casing, thereby providing a triplex structure for reinforcing each side of the casing.

8 Claims, 12 Drawing Sheets

PRIOR ART

FLOPPY DISK DRIVE

This application claims priority to Japanese Patent Application No. 2004-194838 filed Jun. 30, 2004, which is hereby expressly incorporated by reference herein in its entirety.

BACKGROUND OF THE INVENTION

1. Field of the Invention

This invention relates to a floppy disk drive, and in particular to a structure of a frame and a casing of a floppy disk drive, in which the casing includes upper and lower covers for covering the frame.

2. Description of the Prior Art

As is well known, a floppy disk drive (hereinafter, simply referred to as a "disk drive" on occasions) is an apparatus for writing and reading data to and from a floppy disk which is a disk-shaped magnetic recording medium housed in a predetermined cartridge. Such a floppy disk drive is mounted in laptop personal computers, notebook personal computers or notebook word processors or the like.

Generally, such a floppy disk drive includes magnetic heads for writing and reading data to and from a floppy disk, a carriage assembly on which the magnetic heads are provided for allowing the magnetic heads to be moved with respect to the floppy disk along a radial direction thereof, a stepping motor for moving the carriage assembly along the radial direction of the floppy disk, and a spindle motor for rotationally driving the floppy disk.

Figure 9:
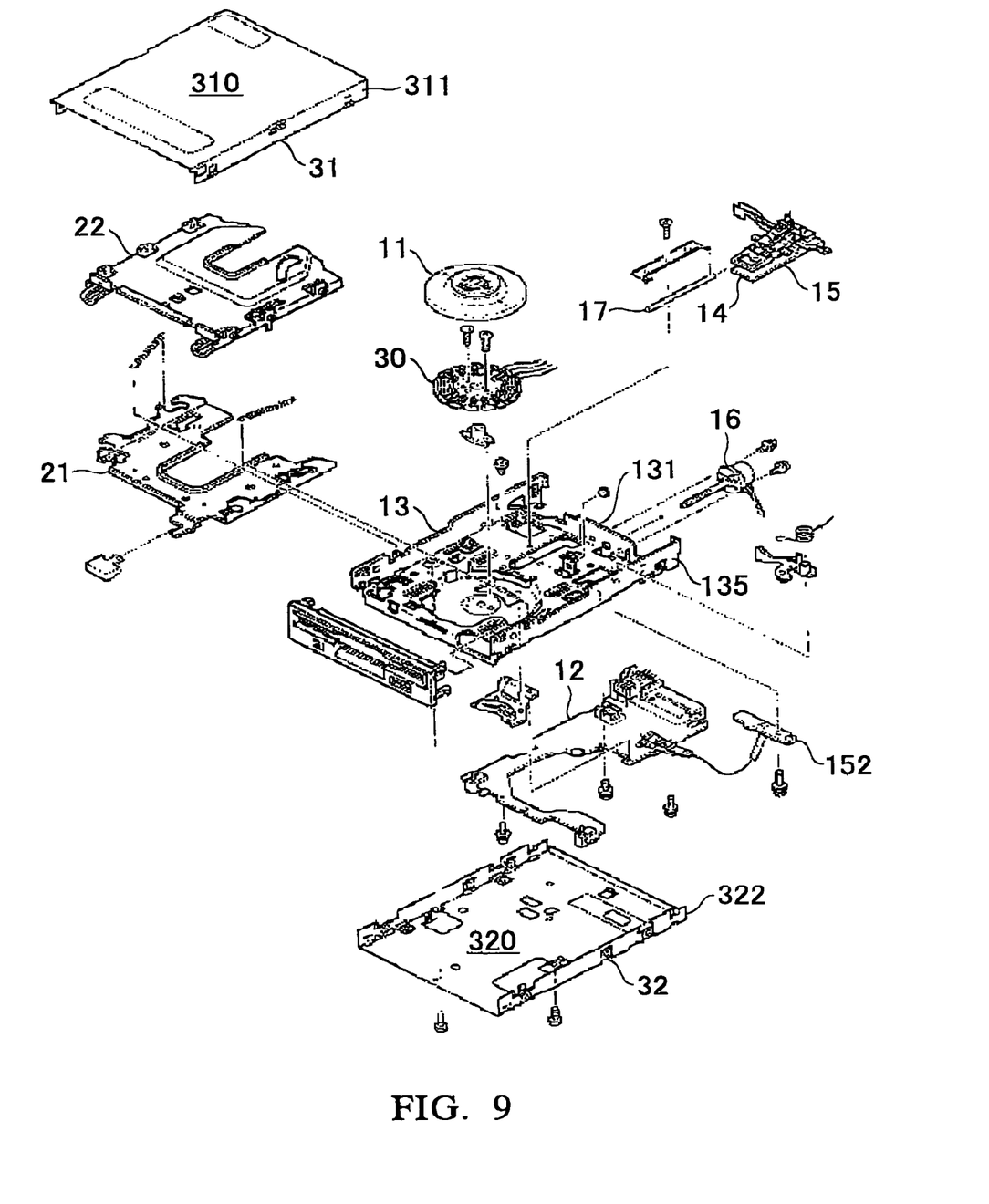
FIG. 9 is an exploded perspective view of a conventional floppy disk drive.
Figure 10:
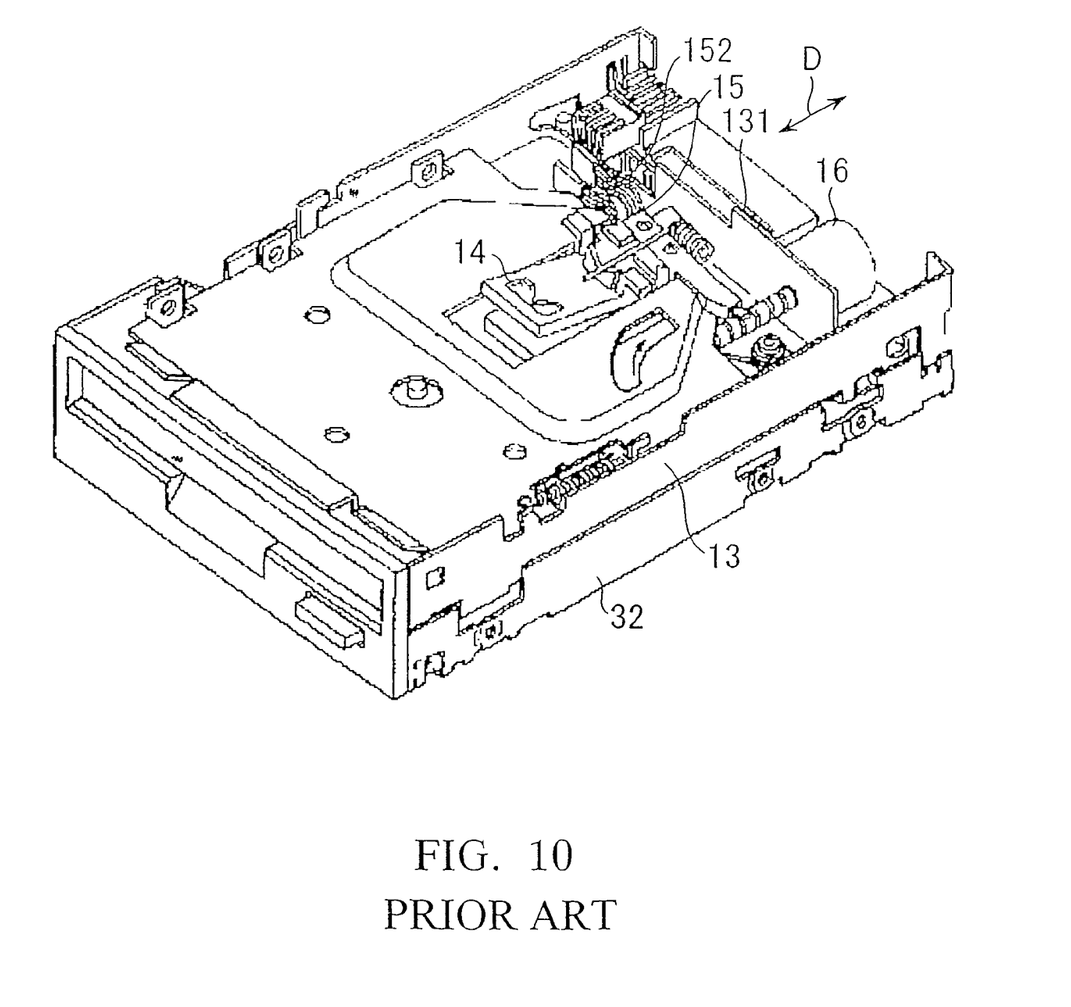
FIG. 10 is a perspective view of the conventional floppy disk drive from which an upper cover has been removed.
Figure 11:
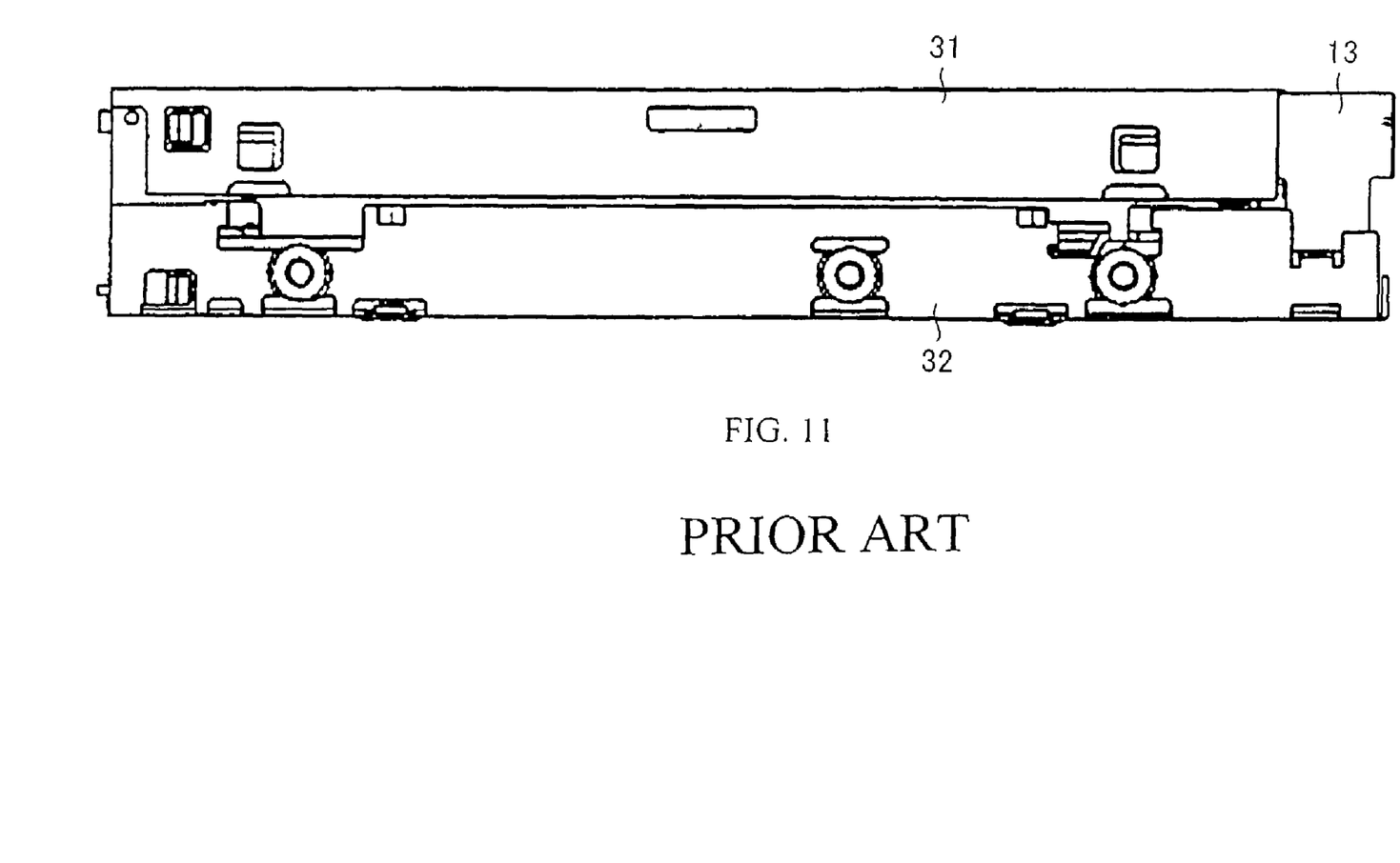
FIG. 11 is a side view of the conventional floppy disk drive.
Figure 12:
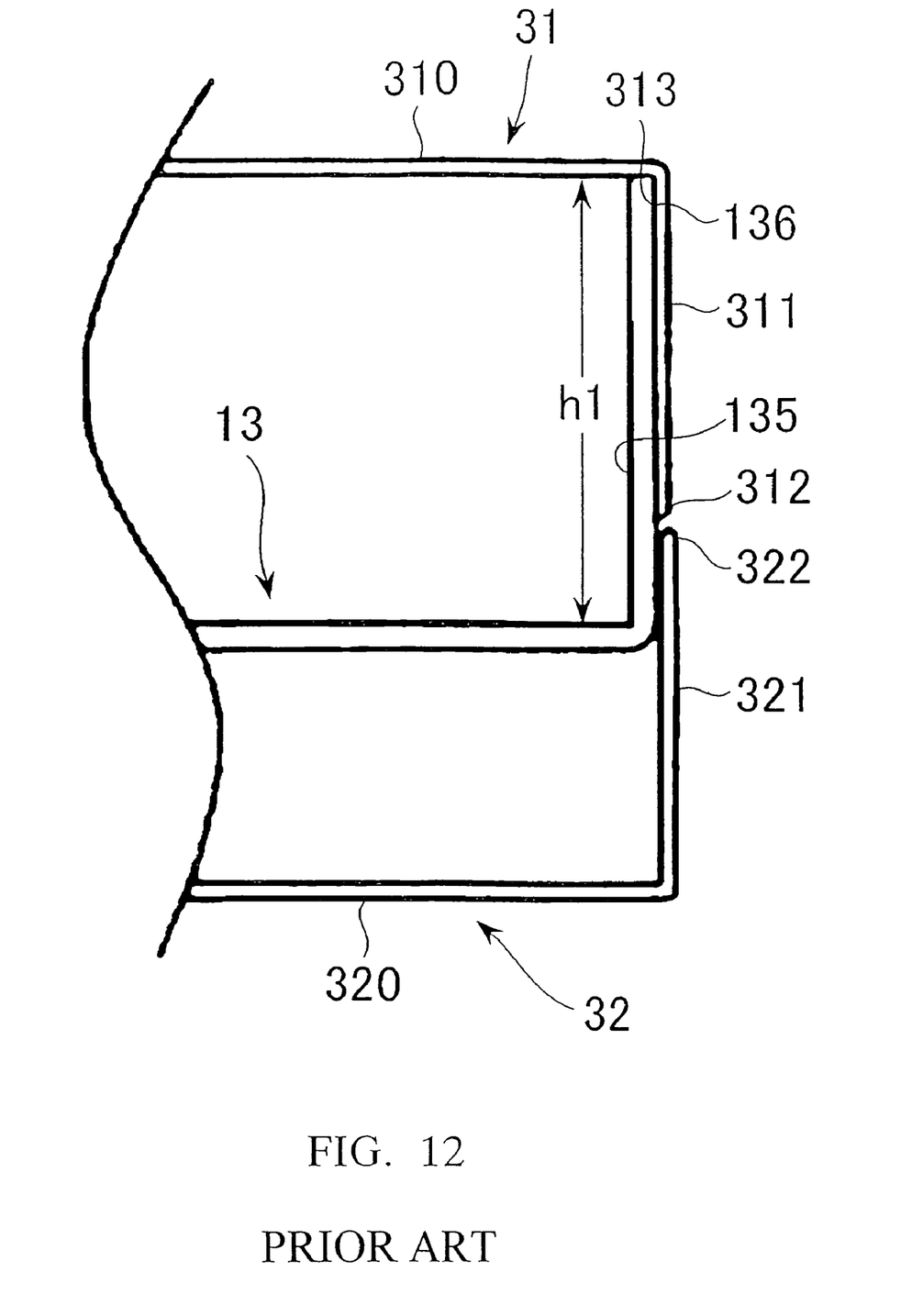
FIG. 12 is a cross sectional view which shows the mutual relations among a frame, an upper cover and a lower cover of the conventional floppy disk drive.

Hereinbelow, based on FIG. 9 to FIG. 12, a description will be made with regard to a floppy disk drive for a 3.5 inch floppy disk which has a conventional structure of a frame and a casing which includes upper and lower covers for covering the frame. FIG. 9 is an exploded perspective view of the conventional floppy disk drive, and FIG. 10 is a perspective view of the conventional floppy disk drive from which an upper cover has been removed. FIG. 11 is a side view of the conventional floppy disk drive, and FIG. 12 is a cross sectional view which shows the mutual relations among a frame, the upper cover and a lower cover of the conventional floppy disk drive.

A floppy disk which has been inserted into the disk drive is held on a disk table in a state that an rotational shaft of the disk table and a center of the disk are aligned with each other. The disk table 11 is rotationally driven by a spindle motor 30 which is provided on a concave portion of the frame 13, thereby the floppy disk is rotated. Further, on the lower surface of the frame 13, a printed circuit board on which many electronic components and parts are mounted is provided.

The floppy disk drive further includes a pair of upper and lower magnetic heads 14 for writing and reading data to and from a floppy disk (note that, only the upper magnetic head is illustrated). These magnetic heads 14 are respectively held on tip portions of a pair of arms of a carriage assembly 15. The tip portions of the arms of the carriage assembly 15 are positioned at both sides of the floppy disk so that the magnetic heads 14 are positioned at the both upper and lower sides of the floppy disk, respectively. The carriage assembly 15 is movably arranged on the frame 13 at the rear side thereof so that the magnetic heads 14 provided on the tip portions of the carriage assembly 15 can move along a predetermined radial direction of a floppy disk (that is, the direction shown by the arrow D in FIG. 10).

A guide rod 17 is arranged on the frame 13 in parallel with the predetermined direction D so that the carriage assembly 15 is guided on the guide road 17. A stepping motor 16 is mounted on a rear frame plate 131 of the frame 13. The stepping motor 16 drives the carriage assembly 15 linearly through the guide rod 17 along the predetermined radial direction D. Specifically, when a lead screw of the stepping motor 16 rotates, a pin attached to the carriage assembly 15 is moved along a helical groove of the lead screw, so that the carriage assembly 15 is moved in the predetermined radial direction D along the guide rod 17.

A flexible print cable (FPC) 152 extends from the carriage assembly 15 in the direction of the guide rod 17, and the tip part of the FPC 152 is electrically connected to a part of the printed wire board 12 provided on the lower surface of the frame 13.

The floppy disk drive further includes an eject plate 21 and a disk holder 22. The frame 13, the eject plate 21 and the disk holder 22 are respectively formed from metal plates which have been subjected to various processes such as a punching process, a press process and a bending process and the like.

Next, with reference to FIG. 11 and FIG. 12, a description will be made with regard to the mutual relations among the frame 13, the upper cover 31 and the lower cover 32.

The upper cover 31 and the lower cover 32 form a casing which covers the frame 13. The upper cover 31 covers an upper side of the frame 13, and the lower cover 32 covers a lower side of the frame 13. The upper cover 31 includes a substantially rectangular top plate 310 and two side plates 311 which are formed by bending the left and right sides of the top plate 310 downwardly, respectively, so that the upper cover 31 has a substantially inverted U-shaped cross section when viewed from the front side of the disk drive. The lower cover 32 includes a substantially rectangular bottom plate 320 and two side plates 321 which are formed by bending the left and right sides of the bottom plate 320 upwardly, respectively, so that the lower cover 32 has a substantially U-shaped cross section when viewed from the front side of the disk drive. When the upper cover 31 and the lower cover 32 are assembled with the frame 13, the side plates 311 of the upper cover 31 and the side plates 321 of the lower cover 32 are arranged on the outer surfaces of the side walls 135 of the frame 13, respectively, so that each of the lower edges 312 of the side plates 311 faces each of the upper edges 322 of the side plate 321 at a roughly middle portion of each side wall 135 to form a substantially continuous outer side surface. Further, since the upper edges 136 of the side walls 135 of the frame 13 are in abutment with the lower surface 313 of the top plate 310 of the upper cover 31, the upper cover 31 is positioned with respect to the frame 13 when assembled. When the floppy disk drive having the casing described above is mounted in a predetermined slot (that is, one inch bay slot) of a computer, the casing is designed so as to have a predetermined size that allows the floppy disk drive to be mounted in the slot.

As described above, in the conventional floppy disk drive, the positioning of the upper cover 31 with respect to the frame 13 when assembling the disk drive is carried out by the abutment of the lower surface 313 of the upper cover 31 against the upper edges 136 of the side walls 135 of the frame 13. Therefore, the side walls 135 of the frame 13 are required to have a predetermined height (see "h1" in FIG. 12) for positioning the upper cover 31 with respect to the frame 13. This means that the side walls 135 of the frame 13 have to have a large size for securing the height h1, which results in a problem in that a large amount of a material (that is, a material for a metal plate) is necessarily required.

Further, the side walls 134 of the frame 13 are also required to have a sufficient mechanical strength against a load applied to the side portions of the casing. Therefore, if the height of the side walls 135 is simply reduced, there arises a problem in that the mechanical strength at the side portions of the disk drive is lowered.

SUMMARY OF THE INVENTION

In view of the above problems, it is an object of the present invention to provide a floppy disk drive which has a frame formed of a reduced amount of a metal material and having a reduced weight, and can realize an easy assembling at the assembling process when it is manufactured as well as maintain a sufficient mechanical strength on the side portions of the casing.

In order to achieve the above object, the present invention is directed to a floppy disk drive comprising a frame which includes a bottom portion and left and right walls which are formed by bending left and right sides of the bottom portion upwardly, respectively, so that the frame has a substantially U-shaped cross section, and a casing for covering the frame. The casing includes an upper cover for covering an upper side of the frame and a lower cover for covering a lower side of the frame, in which the upper cover comprising a substantially rectangular top plate and left and right side plates which are formed by bending left and right sides of the top plate downwardly, respectively, so that the upper cover has a substantially inverted U-shaped cross section, and the lower cover comprising a substantially rectangular bottom plate and left and right plates which are formed by bending left and right sides of the bottom plate upwardly, respectively, so that the lower cover has a substantially U-shaped cross section. Each of the side walls of the frame is designed so as to have size and height that are partially overlapped with the side plate of the upper cover and the side plate of the lower cover, respectively, at each side of the casing.

According to the floppy disk drive of the present invention described above, it is possible to considerably reduce the amount of the metal material to be used for the frame, especially for the side walls thereof, and this also makes it possible to reduce the weight of the floppy disk drive. Further, the mechanical strength at the side portions of the casing can be secured by the arrangement of the side plates of the upper cover and the side plates of the lower cover which are partially overlapped with each other at each side of the casing.

In the present invention, it is preferred that the floppy disk drive further comprises means for positioning the upper cover with respect to the frame when assembled, in which the positioning means includes engaging protrusions formed on each of the side walls of the frame and engaged holes formed in each of the side plates of the upper cover so as to be engaged with the engaging protrusions, respectively. With this structure, although the height of each side wall of the frame is considerably low, the positioning of the upper cover with respect to the frame upon assembling them can be still carried out precisely.

Further, it is also preferred that each of the side walls of the frame, a lower region of each of the side plates of the upper cover and an upper region of each of the side plates of the lower cover are partially and alternately overlapped in this order from the inside of the disk drive toward the outside thereof in each side of the disk drive to provide a triplex structure. This triplex structure makes it possible to ensure a sufficient mechanical strength at each side portion of the disk drive.

Furthermore, it is also preferred that a ridged portion which is formed by drawing so as to extend horizontally is formed in the upper region of each of the side plates of the upper cover, the ridged portion has a raised top surface which is located on the same plane as an outer surface of each of the side plates of the lower cover. These ridged portions function to reinforce the side portions of the side plates of the upper cover. Further, due to the provision of such a ridged portion, a step which is formed between each side plate of the upper cover and each side plate of the lower cover by the triplex structure can be made obscure, so that each side portion of the disk drive can have a substantially flat configuration. With this result, it is possible to stably mount the disk drive within the slot of the computer.

Moreover, it is also preferred that a part of the upper region of each of the side plates of the lower cover is folded into the inside the lower region of each of the side plates of the upper cover. According to this structure, when a heavy load is applied to the side portion of the casing, it is dispersed by the connecting structure, so that deformation of the upper and lower cover 41, 42 can be prevented.

Further, in the present invention, the triplex structure may be constructed from the side wall of the frame, the upper region of the side plate of the lower cover and the lower region of the side plate of the upper cover which are partially and alternately overlapped with each other and arranged in this order from the inside of the disk drive toward the outside thereof.

Furthermore, in the present invention, the ridged portion may be formed in the lower region of each of the side plates of the lower cover instead of the upper region of each of the side plates of the upper cover described above.

Moreover, in the present invention, the connecting structure described above may be changed so that a part of the lower region of each of the side plates of the upper cover is folded into the inside the upper region of each of the side plates of the lower cover.

The above described and other objects, structures and advantages of the present invention will be more apparent when the following description of the preferred embodiment is considered taken in conjunction with the appended drawings.

DETAILED DESCRIPTION OF THE PREFERRED EMBODIMENTS

Hereinbelow, a detailed description of a floppy disk drive according to an embodiment of the present invention will be described with reference to the attached drawings. Since the floppy disk drive of this embodiment is provided with the same internal structures as those of the conventional floppy disk drive shown in FIGS. 9 to 12, the detailed description of the common internal structures are omitted.

Figure 1:
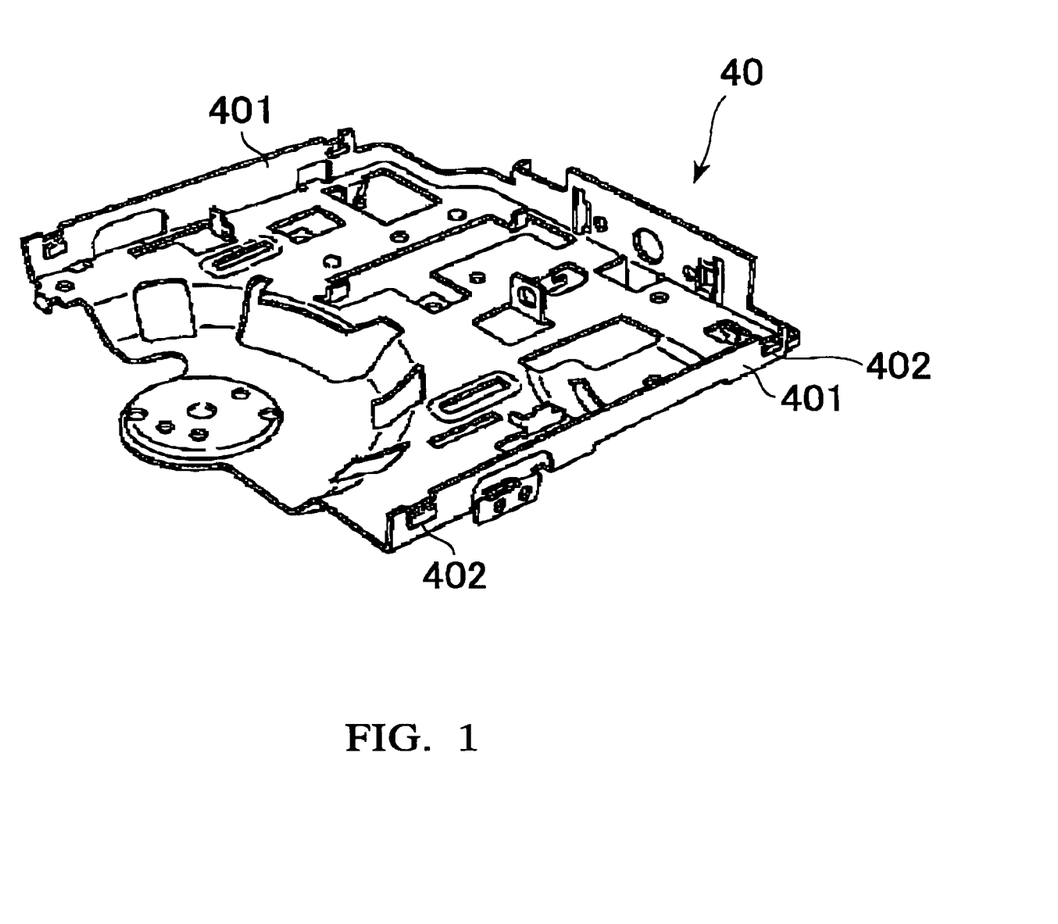
FIG. 1 is a perspective view of a frame of a floppy disk drive according to an embodiment of the present invention.
Figure 2:
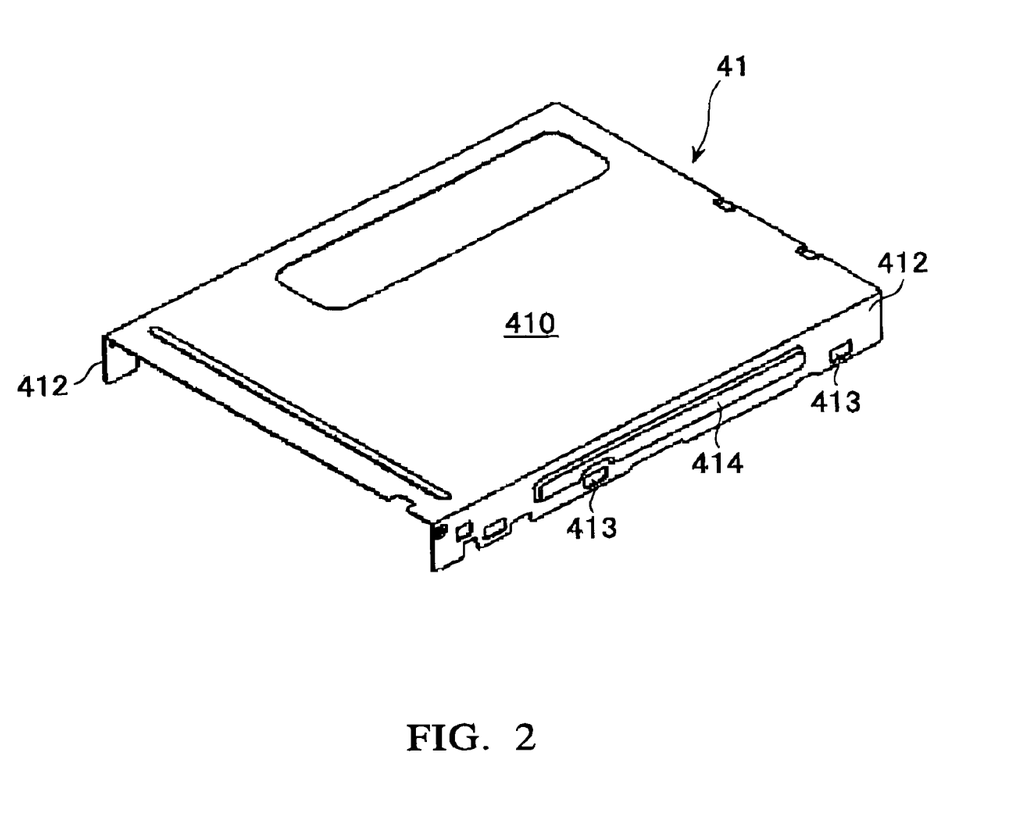
FIG. 2 is a perspective view of an upper cover of the floppy disk drive according to the embodiment of the present invention.
Figure 3:
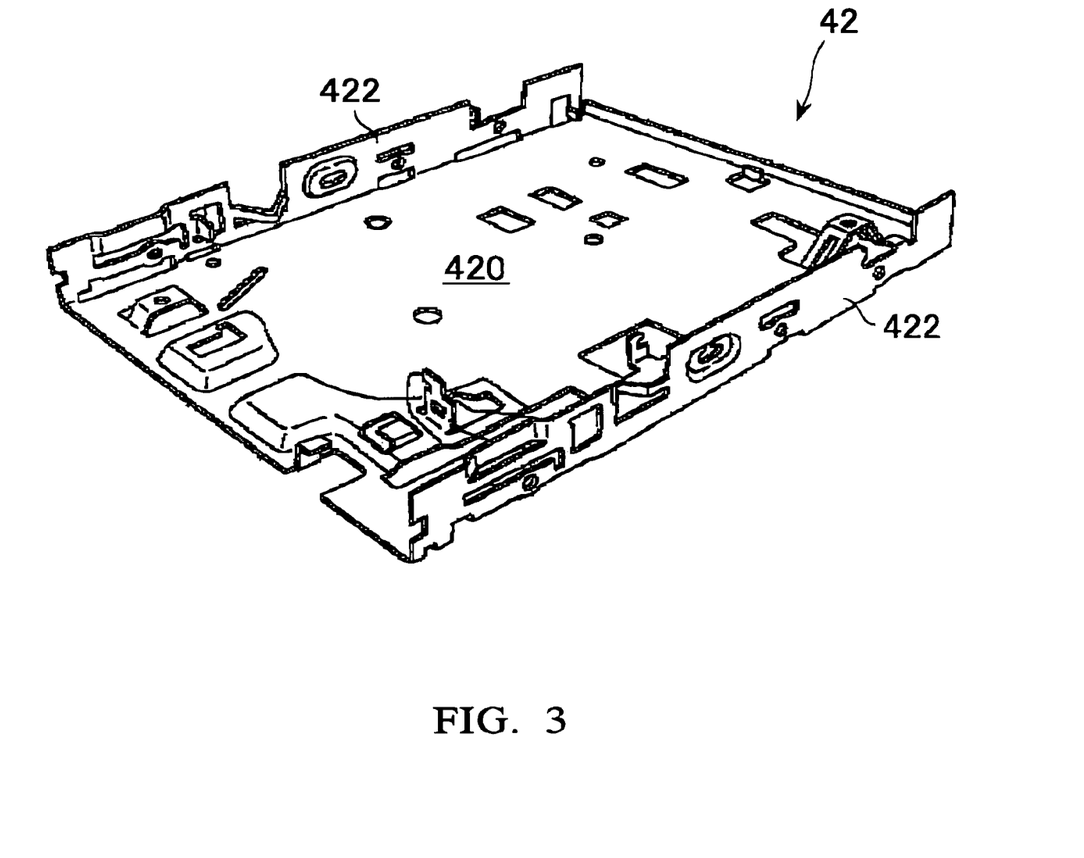
FIG. 3 is a perspective view of a lower cover of the floppy disk drive according to the embodiment of the present invention.
Figure 4:
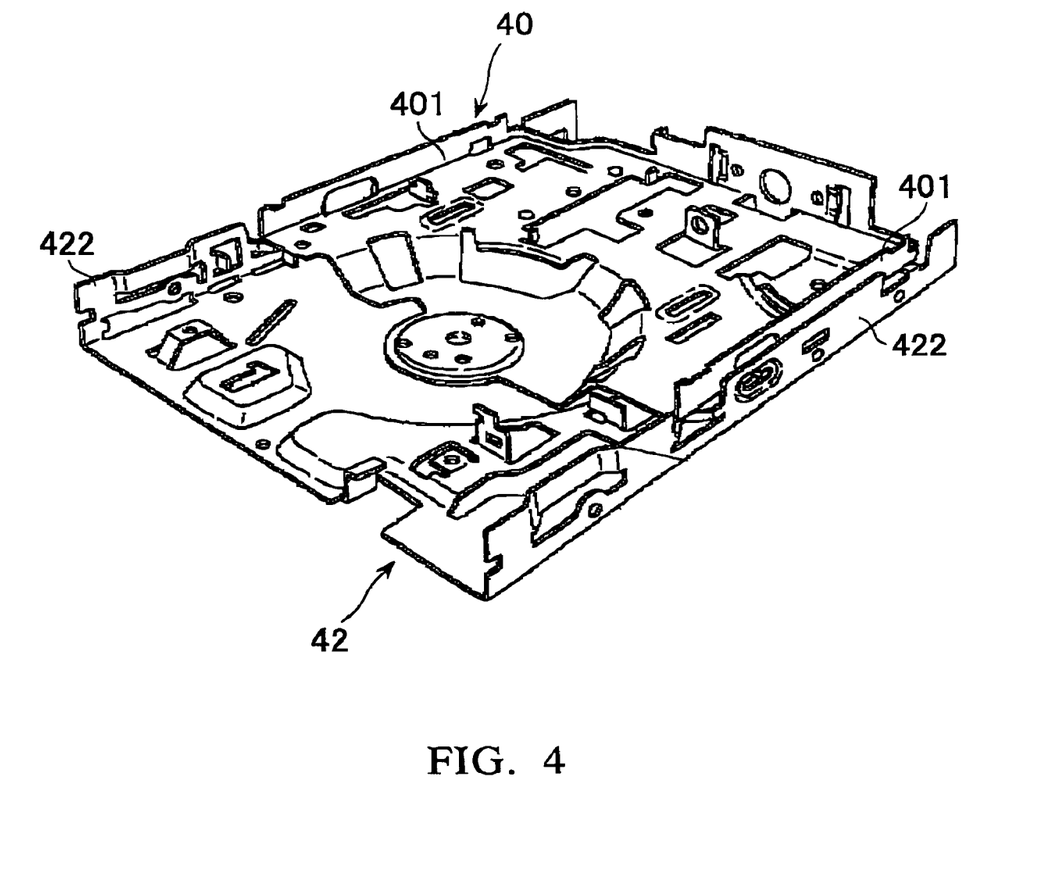
FIG. 4 is a perspective view which shows a state that the lower cover is assembled with the frame.
Figure 5:
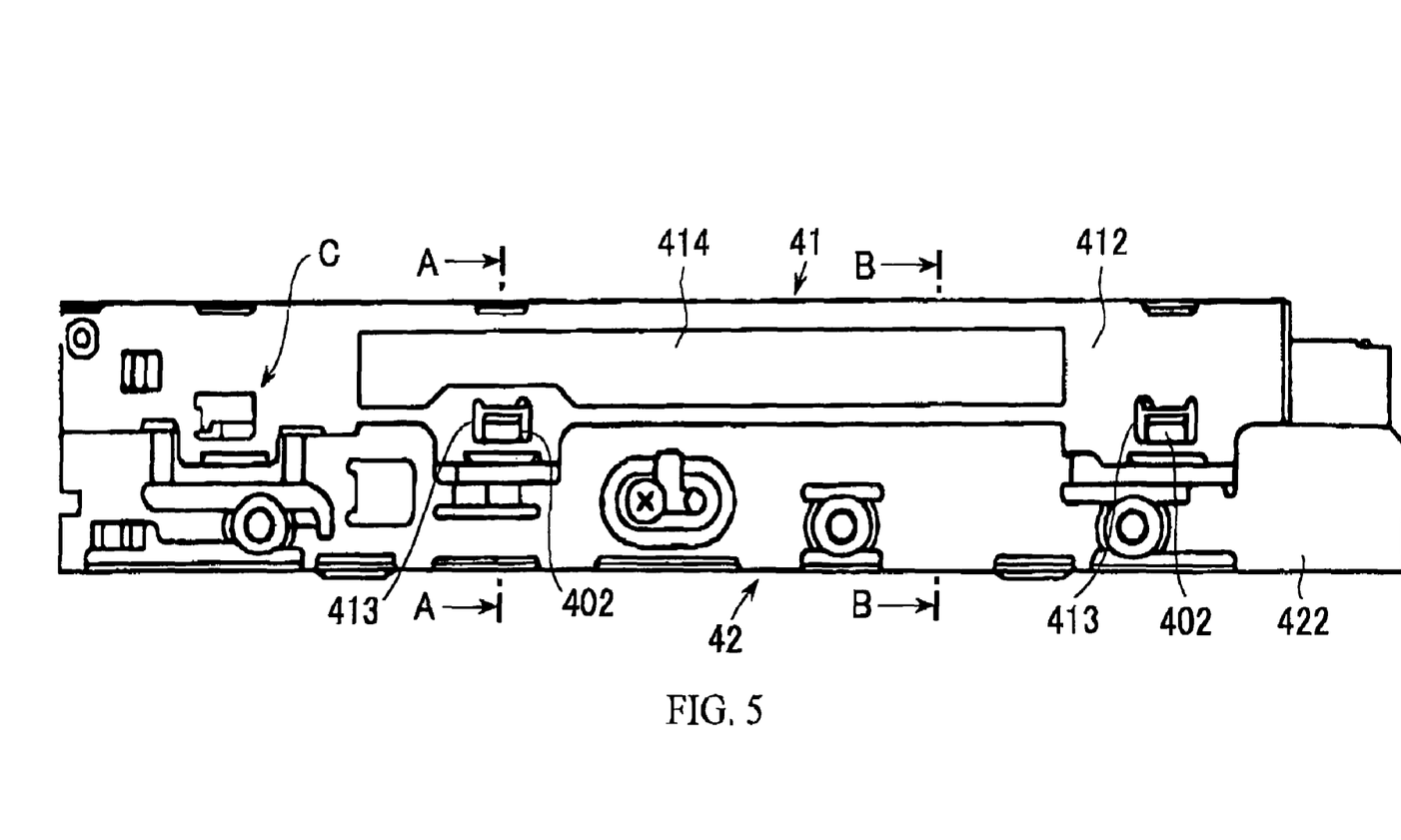
FIG. 5 is a side view of the floppy disk drive according to the embodiment of the present invention.
Figure 6:
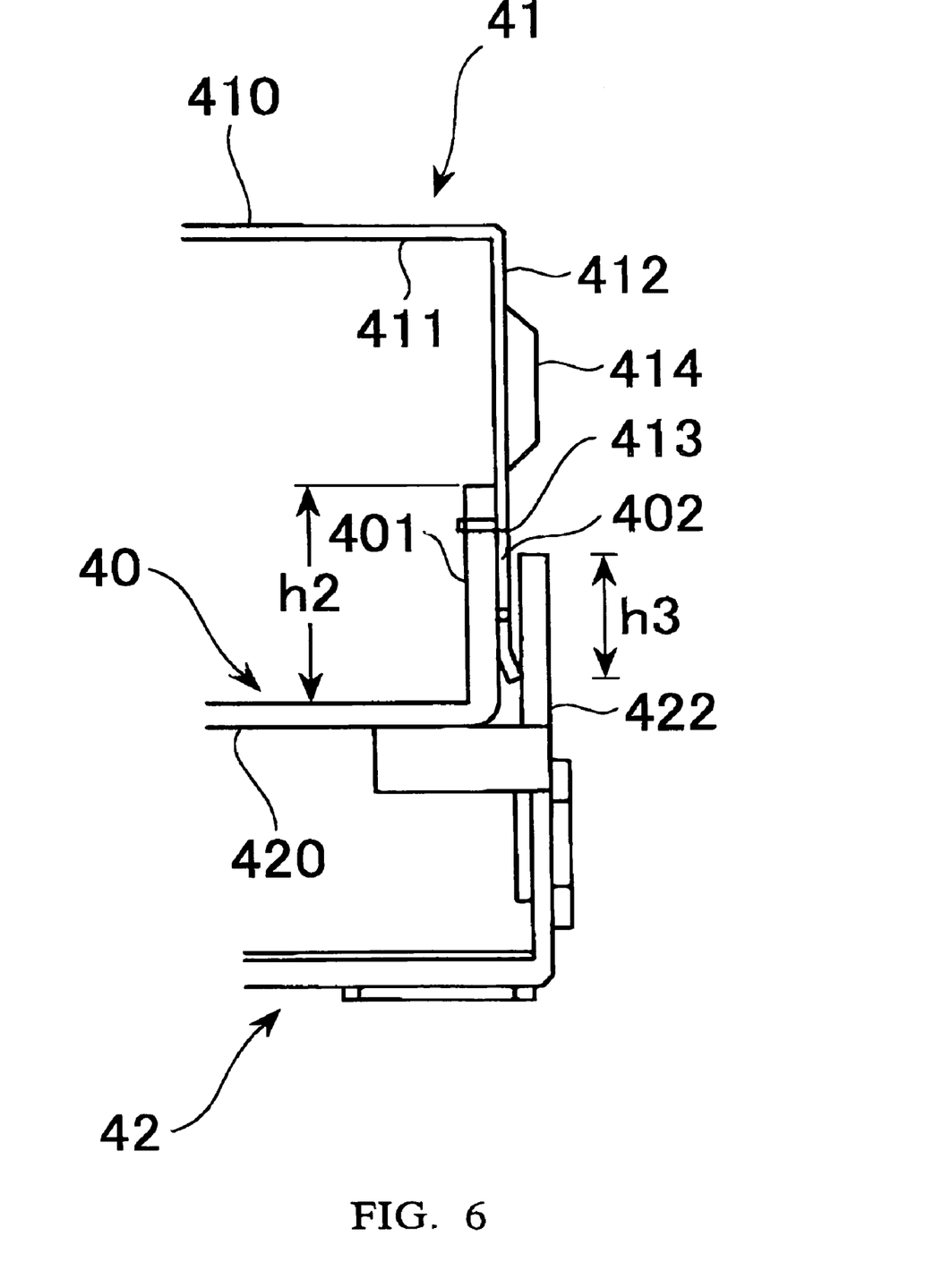
FIG. 6 is a cross sectional view taken along a line A-A in FIG. 5.
Figure 7:
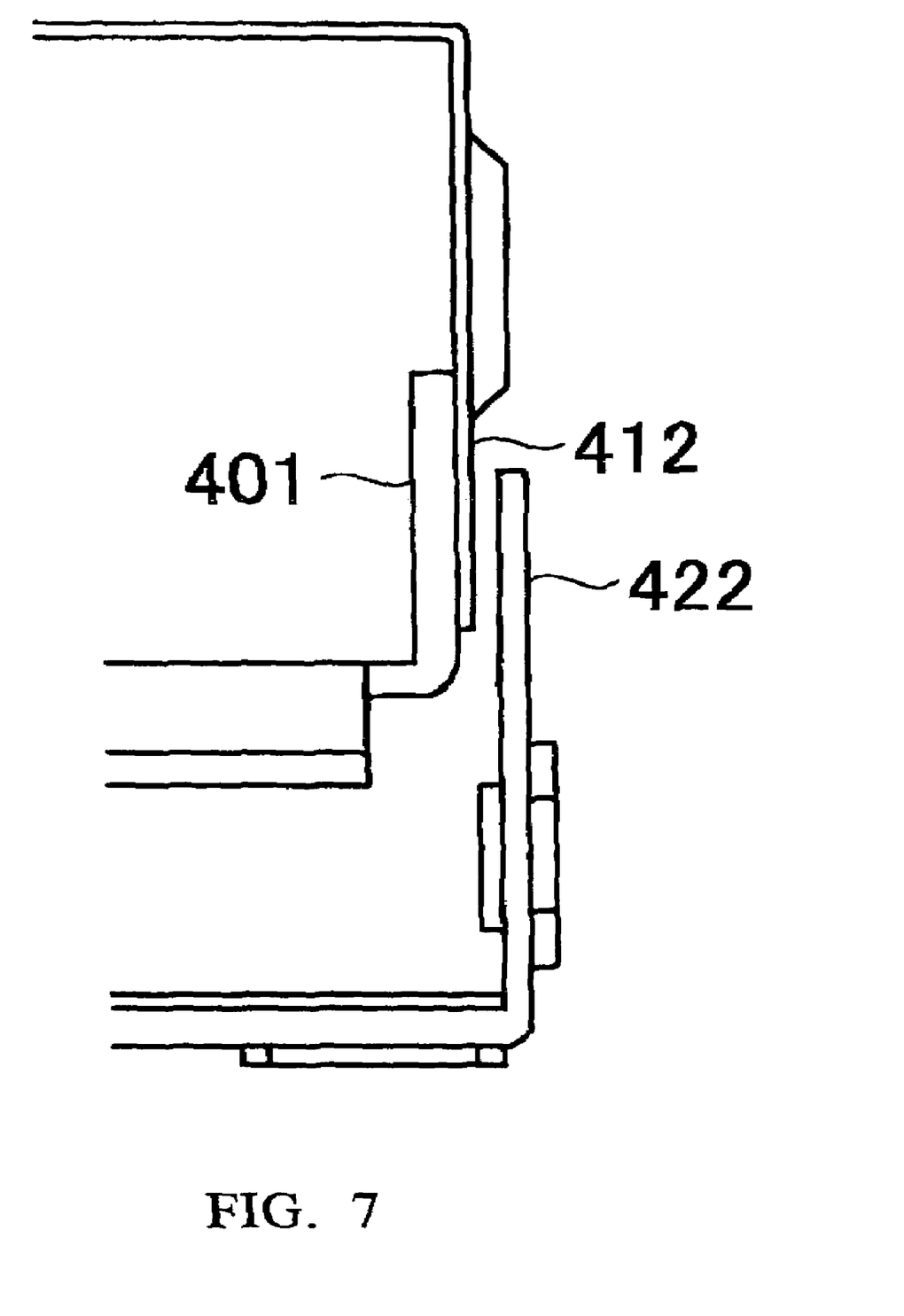
FIG. 7 is a cross sectional view taken along a line B-B in FIG. 5.
Figure 8:
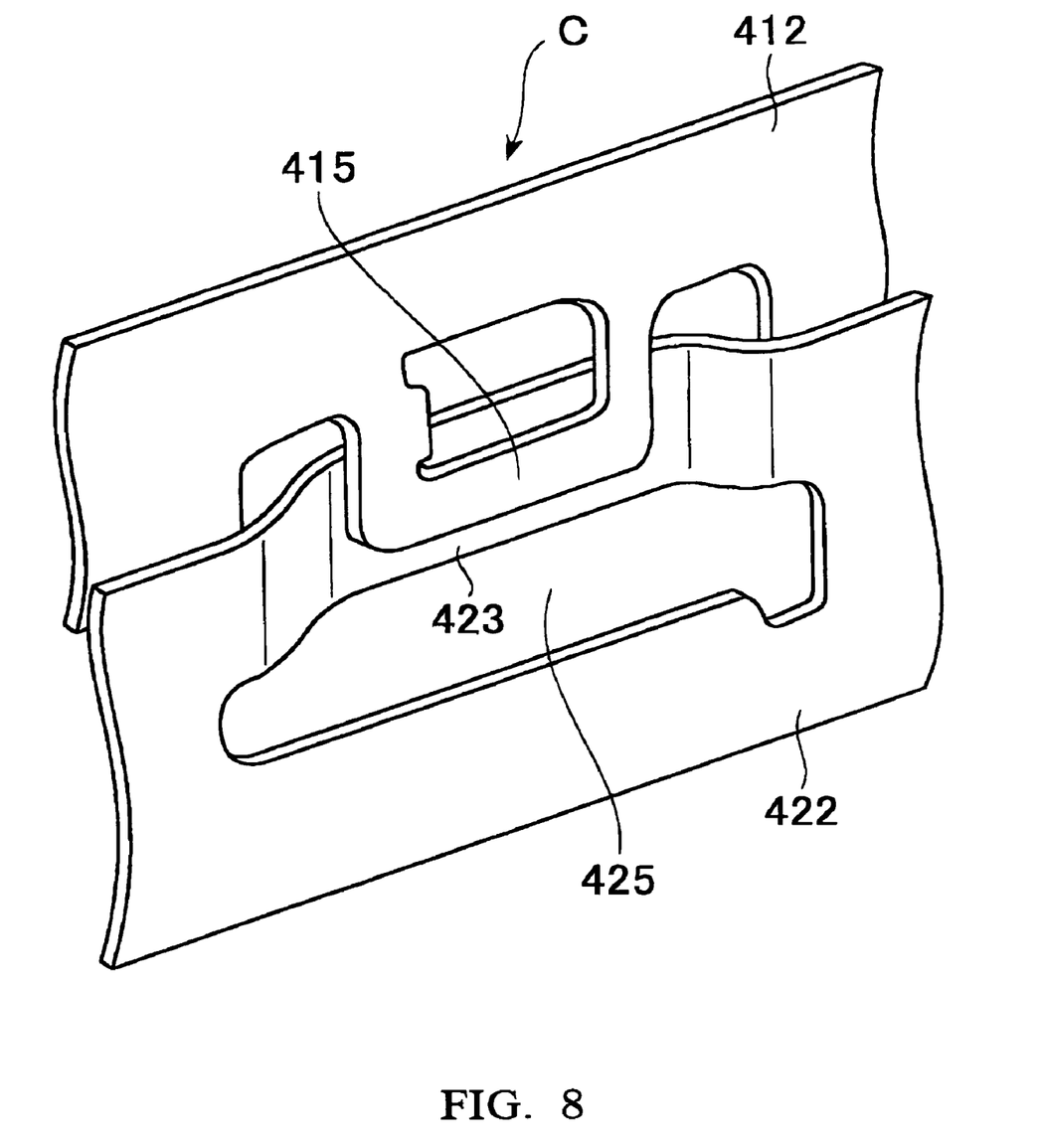
FIG. 8 is an enlarged perspective view of a part of a lattice-shaped connecting portion C shown in FIG. 5.

FIG. 1 is a perspective view of a frame of a floppy disk drive according to an embodiment of the present invention; FIG. 2 is a perspective view of an upper cover of the floppy disk drive according to the embodiment of the present invention; FIG. 3 is a perspective view of a lower cover of the floppy disk drive according to the embodiment of the present invention; FIG. 4 is a side view which shows a state that the lower cover is assembled with the frame; FIG. 5 is a side view of the floppy disk drive according to the embodiment of the present invention; FIG. 6 is a cross sectional view taken along a line A-A in FIG. 5; FIG. 7 is a cross sectional view taken along a line B-B in FIG. 5; and FIG. 8 is an enlarged perspective view of a part of a lattice-shaped connecting portion C shown in FIG. 5.

As shown in FIG. 1, a frame 40 is formed from a single metal plate. The frame 40 includes a bottom portion and left and right walls 401 which are formed by bending the left and right sides of the bottom portion upwardly, respectively, so that the frame 40 has a substantially inverted U-shaped cross section when viewed from the front side of the disk drive. On the outer surface of each of the side walls 401, there are formed a pair of engaging protrusions 402 which are adapted to be engaged with corresponding engaged holes formed in an upper cover 41 as described below.

When the frame 40 is compared with the frame 13 of the conventional disk drive described above (see FIG. 10), it can be seen that the entire size of the frame 40 is made small as compared with the conventional one, and the height of each side wall 401 of the frame 40 is about half of the height of the side plate of the conventional frame 13. Therefore, it is possible to reduce an amount of a metal material used for forming the frame, thereby realizing a reduced weight of the disk drive. In the present invention, in order to solve various problems derived from the reduced size and weight of the frame 40 such as a lowered mechanical strength or the like, a reinforcing structure for side portions of the floppy disk drive has been developed, in which each of the side walls of the frame 40 is partially overlapped with each of the side plates 412 of the upper cover 41 and each of the side plates 422 of the lower cover 42. Further, a positioning structure for positioning the upper cover 41 with respect to the frame 40 when assembled is also developed. For these purposes, a lattice shaped connecting portion C is formed on in each side of the casing between the upper cover 41 and the lower cover 42, and a ridged portion 144 is formed in each of the side plates 412 of the upper cover 41 (which will be described later in details).

FIG. 2 shows the upper cover 41 which is formed by bending a single metal plate. The upper cover 41 includes a substantially rectangular top plate 410 and left and right side plates 412 which are formed by bending left and right sides of the top plate 410 downwardly, respectively, so that the upper cover 41 has a substantially inverted U-shaped cross section when viewed from the front side of the disk drive. In a lower region of each of the side plates 412 of the upper cover 41, there are formed a pair of engaged holes 413, which are adapted to be engaged with the engaging protrusions 402 as described above.

Further, in the upper region of each side plate 412 of the upper cover 41, there is formed a ridged portion 144 which is formed by drawing so as to extend horizontally. As will be described later, the ridged portions 144 are provided for reinforcing the side plates 411 of the upper cover 41. Further, each of the ridged portions 144 is formed so that its raised top surface is located on the same plane as that of the outer surface of the side plate 422 of the lower cover 42.

FIG. 3 shows the lower cover 42 which is also formed by bending a single metal plate. The lower cover 42 includes a substantially rectangular bottom plate and left and right side plates 422 which are formed by bending left and right sides of the top plate upwardly, respectively, so that the lower cover 42 has a substantially U-shaped cross section when viewed from the front side of the disk drive.

The width of the lower cover 42 in the left to right direction is wider than the width of the upper cover 41 in the left to right direction, so that the lower region of each side plate 412 of the upper cover 41 is positioned inside each side plate 422 of the lower cover 42 excepting a portion where the lattice-shaped connecting portion C described later is provided.

FIG. 4 shows a state that the lower cover 42 is assembled with the frame 40. As shown in this figure, the width between the side plates 422 of the lower cover 42 is wider than the width between the side walls 401 of the frame 40 so that the frame 40 is disposed inside the lower cover 42. As stated above, since the space is provided between each of the side walls 401 of the frame 40 and each of the side plates 422 of the lower cover 42, the lower region of each side plate 412 of the upper cover 41 is fittingly inserted into this space when the upper cover 41 is assembled with the frame provided with the lower cover 42.

Next, a description will be made with regard to the state that the frame 40 is assembled with the lower cover 42 and the upper cover 41.

As shown in FIG. 6, the upper side of the frame 40 having the U-shape cross section is covered with the upper cover 41 having the inverted U-shape cross section, and the lower side of the frame 40 is covered with the lower cover 42 having the U-shape cross section. In this regard, it should be noted that the height "h2" of each side wall 401 of the frame 40 is about the half of the height of each side plate 412 of the upper cover 41, thus the upper edge of each side wall 401 of the frame 40 does not reach an under surface 411 of the top plate 410 of the upper cover 41.

The upper cover 41 is assembled with the frame 40 so that the inner surface of the lower region of each side plate 412 of the upper cover 41 is in contact with the outer surface of each side wall 401 of the frame 40. In this state, the engaging protrusions 402 formed on each side wall 401 of the frame are respectively engaged with the engaged holes 413 which are formed by punching the corresponding portions of each side plate 412. By the engagement between the engaging protrusions 402 and the engaged holes 413, the positioning of the upper cover 41 with respect to the frame 41 is carried out in the height direction of the disk drive as well as the front to rear direction thereof.

Further, each of the side plates 422 of the lower cover 42 is arranged outside each of the side plates 412 of the upper cover 41. With this result, within the region indicated by "h3" in FIG. 6 in the height direction, the side wall 401, the lower region of the side plate 412 of the upper cover 41 and the upper region of the side plate 422 of the lower cover 42 are overlapped with each of the in this order from the inside of the disk drive toward the outside thereof. Therefore, the region indicated by "h3" provides a triplex structure by the side walls 401 of the frame 40, the side plates 412 of the upper cover 41 and the side plates 422 of the lower cover 42. Such a triplex structure is also existed in the region of the disk drive shown in FIG. 7 which is a cross sectional view taken along a line B-B in FIG. 5.

Furthermore, as is clearly shown in FIG. 6 and FIG. 7, the top surface of a ridged portion 414 formed by drawing in the upper region of each of the side plates 412 of the upper cover 41 is located on the same plane as the outer surface of the side plate 422 of the lower cover 42. Due to the provision of such a ridged portion 414, a step between each side plate 412 of the upper cover 41 and each side plate 422 of the lower cover 42 can be made obscure, so that each side portion of the disk drive can have a substantially flat configuration.

The lattice-shaped connecting portion C shown in FIG. 5 has a deformed portion 423 which is formed by inwardly deforming a part of the side plate 422 of the lower cover 42 as shown in FIG. 8. In more detail, an elongated opening 425 is formed in a part of the upper region of each side plate 422 of the lower cover 42 50 that a beam-like part is left between the upper edge of the opening 425 and the upper edge of the side plate 422. The deformed portion 423 is formed by deforming this beam-like part of the lower cover 42 inwardly. Further, at the corresponding portion of the side plate 412 of the upper cover 41 a hook part 415 is formed by cutting out a part of the corresponding portion of the lower cover 42 into a substantially U-shape. With this structure, the hook part 415 is engaged with the deformed portion 423 when the upper cover 41 is assembled with the lower cover 42 so that the part of the upper cover 41 and the part of the lower cover 42 are engaged in a lattice manner, thereby providing the lattice-shaped connecting portion C as shown in FIG. 8.

Hereinbelow, advantages of the floppy disk drive according to the embodiment described above will be described.

First, as described above, each of the side walls 401 of the frame 40 is formed into the shape having the height and size that is partially overlapped with the side plate 412 of the upper plate 41, and the side plate 412 of the upper cover 41 is partially overlapped with the side plate 422 of the lower cover at each of the side portions of the casing. This structure makes it possible to considerably reduce the amount of the metal material to be used for the frame 40, especially for the side walls 401 thereof, and this also makes it possible to reduce the weight of the floppy disk drive. On the other hand, this structure in turn lowers the mechanical strength at the side portions of the casing. However, the lowered mechanical strength at the side portions can be compensated by the arrangement of the upper cover 41 and the lower cover 42 which are partially overlapped with each other.

Further, the frame 40 of the floppy disk drive is provided with the positioning means for positioning the upper cover 41 with respect to the frame 40 when they are assembled, in which the positioning means is constructed from the engaging protrusions 402 formed on each side wall 401 of the frame 40 and the engaged holes 413 formed in each side plate 412 of the upper cover 41. With this structure, although the height of each side wall 401 of the frame 40 is considerably low, the positioning of the upper cover 41 with respect to the frame 40 upon assembling them can be still carried out precisely, and this also makes it possible to reduce the amount of the material to be used for the side walls 401 of the frame 40.

Furthermore, as shown in FIG. 6, in each side portion of the disk drive, the side wall 401 of the frame 40, the lower region of the side plate 411 of the upper cover 41 and the upper region of the side plate 412 of the lower cover 42 are overlapped with each other in this order from the inside of the disk drive toward the outside thereof to provide the triplex structure at each side portion of the disk drive. Therefore, it is possible to ensure a sufficient mechanical strength in the region indicated by the height "h3" in FIG. 6 at each side portion of the disk drive.

Moreover, in the upper region of each of the side plates 412 of the upper cover 41, there is formed the ridged portion 414 which is formed by drawing so as to extend horizontally. These ridged portions function to reinforce the side portions of the side plates 412 of the upper cover 41. Further, each of the ridged portions 414 is formed so that its raised top surface is located on the same plane as that of the outer surface of the side plate 422 of the lower cover 42. Due to the provision of such a ridged portion, a step which is formed between each side plate 412 of the upper cover 41 and each side plate 422 of the lower cover 42 by the triplex structure can be made obscure, so that each side portion of the disk drive can have a substantially flat configuration. With this result, it is possible to stably mount the disk drive within the slot of the computer.

Moreover, in the floppy disk drive described above, there is provided the lattice-shaped connecting portion C where a part of the upper region of the side plate 422 of the lower cover 42 is folded into the inside of the lower region of the side plate 412 of the upper cover 41. In this lattice-shaped connection portion C, the part of the side plate 412 of the upper cover 41 and the part of the side plate 422 of the lower cover 42 are arranged in a lattice like manner, thereby providing a connecting structure using a kind of leaf springs. Therefore, when a heavy load is applied to the side portion of the casing, it is dispersed by the lattice structure, so that deformation of the upper and lower cover 41, 42 can be prevented.

In the above embodiment, in each side portion of the disk drive, the side wall 401 of the frame 40, the lower region of the side plate 412 of the upper cover 41 and the upper region of the side plate 422 of the lower cover 42 are overlapped with each other in this order from the inside of the disk drive toward the outside thereof to provide the triplex structure. However, in another embodiment of the present invention, in each side portion of the disk drive, the side wall 401 of the frame 40, the upper region of the side plate 422 of the lower cover 42 and the lower region of the side plate 412 of the upper cover 41 may be overlapped with each other in this order from the inside of the disk drive toward the outside thereof to provide the triplex structure. In this arrangement, a ridged portion corresponding to the ridged portion 414 is formed in the lower region of each of the side plates 422 of the lower cover 42 so as to extend horizontally. Further, the ridged portion is formed so that its top surface is on the same plane as that of the outer surface of the side plate 412 of the upper cover 41. Furthermore, in a connecting portion corresponding to the lattice-shaped connecting portion C described above, a part of the lower region of the side plate 412 of the upper cover 41 is folded into inside the upper region of the side plate 422 of the lower cover 42. According to this embodiment, it is also possible to enjoy the same advantages as those described above.

Finally, it is needless to mention that the present invention is not limited to the above-described embodiments but can be modified or improved in various ways within the scope described in the following claims.

We claim:

1. A floppy disk drive, comprising:

a frame which includes a bottom portion and left and right walls which are formed by bending left and right sides of the bottom portion upwardly, respectively, so that the frame has a substantially U-shaped cross section; and a casing for covering the frame, the casing including an upper cover for covering an upper side of the frame and a lower cover for covering a lower side of the frame, in which the upper cover comprising a substantially rectangular top plate and left and right side plates which are formed by bending left and right sides of the top plate downwardly, respectively, so that the upper cover has a substantially inverted U-shaped cross section, and the lower cover comprising a substantially rectangular bottom plate and left and right plates which are formed by bending left and right sides of the bottom plate upwardly, respectively, so that the lower cover has a substantially U-shaped cross section, wherein each of the side walls of the frame is designed so as to have size and height that are partially overlapped with the side plate of the upper cover and the side plate of the lower cover, respectively, at each side of the casing.

2. The floppy disk drive as claimed in claim 1, further comprising means for positioning the upper cover with respect to the frame when assembled, in which the positioning means includes engaging protrusions formed on each of the side walls of the frame and engaged holes formed in each of the side plates of the upper cover so as to be engaged with the engaging protrusions, respectively.

3. The floppy disk drive as claimed in claim 1, wherein each of the side walls of the frame, a lower region of each of the side plates of the upper cover and an upper region of each of the side plates of the lower cover are partially and alternately overlapped in this order from the inside of the disk drive toward the outside thereof in each side of the disk drive to provide a triplex structure.

4. The floppy disk drive as claimed in claim 3, wherein a ridged portion which is formed by drawing so as to extend horizontally is formed in the upper region of each of the side plates of the upper cover, the ridged portion has a raised top surface which is located on the same plane as an outer surface of each of the side plates of the lower cover.

5. The floppy disk drive as claimed in claim 3, wherein a part of the upper region of each of the side plates of the lower cover is folded into the inside the lower region of each of the side plates of the upper cover.

6. The floppy disk drive as claimed in claim 3, wherein in each side portion of the floppy disk drive, the side wall of the frame, the upper region of the side plate of the lower cover and the lower region of the side plate of the upper cover are partially and alternately overlapped with each other in this order from the inside of the disk drive toward the outside thereof to provide a triplex structure.

7. The floppy disk drive as claimed in claim 6, wherein a ridged portion which is formed by drawing so as to extend horizontally is formed in the lower region of each of the side plates of the lower cover, the ridged portion has a raised top surface which is located on the same plane as an outer surface of each of the side plates of the upper cover.

8. The floppy disk drive as claimed in claim 6, wherein a part of the lower region of each of the side plates of the upper cover is folded into the inside the upper region of each of the side plates of the lower cover.

* * * * *

UNITED STATES PATENT AND TRADEMARK OFFICE
CERTIFICATE OF CORRECTION

PATENT NO. : 7,295,399 B2 Page 1 of 1
APPLICATION NO. : 11/066089
DATED : November 13, 2007
INVENTOR(S) : Konno et al.

It is certified that error appears in the above-identified patent and that said Letters Patent is hereby corrected as shown below:

Column 7, line 25, "50" should be changed to --so--.

Column 7, line 30, "41" should be changed to --41,--.

Signed and Sealed this

Thirtieth Day of September, 2008

JON W. DUDAS
*Director of the United States Patent and Trademark Office*